FULL WAVE RECTIFIER STRUCTURE AND METHOD OF PREPARING SAME

Filed June 27, 1961

INVENTOR
GEORGE ZACHARELLIS
BY Ralph T. Libre
AGENT

United States Patent Office 3,235,779
Patented Feb. 15, 1966

3,235,779

FULL WAVE RECTIFIER STRUCTURE AND METHOD OF PREPARING SAME

George Zacharellis, Nixon, N.J., assignor to Merck & Co., Inc., Rahway, N.J., a corporation of New Jersey Filed June 27, 1961, Ser. No. 120,021
3 Claims. (Cl. 317—234)

This invention relates to semiconductor devices and more particularly it relates to a novel structure for use in obtaining full wave rectification.

It is common in the art to provide full wave rectification devices by combining separate rectifying diodes in various configurations. The major difficulty that has confronted the art with respect to this technique has been one of providing suitable mechanical methods for connecting the diodes to each other. In consequence of the nature of the various techniques and materials which are used to make the connections, considerable difficulty has been encountered in maintaining mechanically rigid ohmic connections, such that when the device is subsequently put into operation no separation of these connections occurs. It is apparent then that a full wave rectifying device which does not require mechanical connections between the various semiconductor diodes and provides instead a unitary continuous structure would be very desirable.

Accordingly, it is an object of the present invention to provide a unitary solid state full wave rectifier structure.

It is another object of the present invention to provide a full wave rectifier which does not require external connections between rectifying diodes.

These and other objects will become more apparent when the following disclosure is considered in conjunction with the accompanying drawings, wherein.

Figure 1:
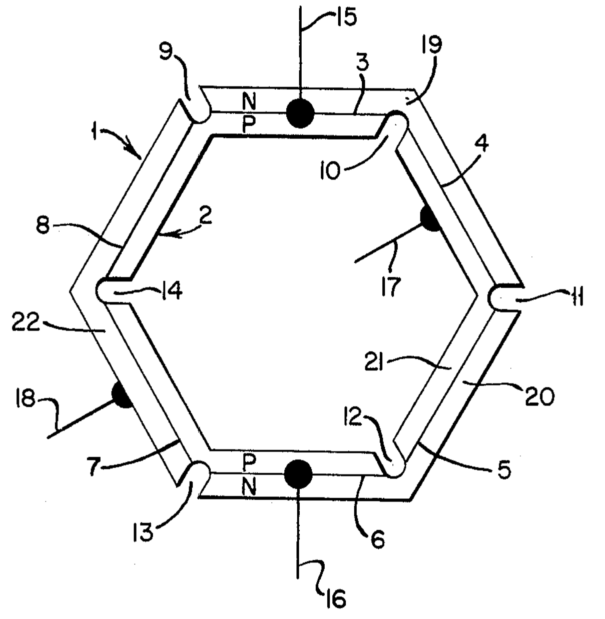
FIGURE 1 represents a unitary full wave rectifier of the present invention.

In general, the device of the present invention is a polygonally shaped body having polygonally disposed rectifying diodes crystallographically affixed to each other. It includes an exterior semiconductor layer of one conductivity type crystallographically affixed to an interior semiconductor layer of opposite conductivity type. These layers form the p-n junctions of a series of rectifying diodes which are either electrically connected to or isolated from each other in a predetermined fashion through the utilization of two expedients; (a) actual physical discontinuities properly positioned in the layers, and (b) the phenomenon of the reverse biased junction which allows for the electrical isolation of various parts of the device notwithstanding that they are physically connected. The device further includes electrical input and output leads appropriately affixed in such locations that the combination of discontinuities therewith renders the device capable of conducting electrical current along a predetermined path such that a D.C. output is obtained when an A.C. signal is applied to the device inputs.

The device of the present invention may be fabricated as follows. There is first provided a semiconductor body having a polygonally shaped p-n junction therein. As used herein, the term "polygonal" is meant to include any closed, continuous configuration having planar or arcuate sides. The plane of the p-n junction need not be at any particular angle to the plane of the polygon which characterizes the device. It is preferred, however, in order to obtain consistency in operating characteristics throughout all portions of the device, that the plane of the p-n junction be normal or parallel to the plane of the general polygon of the device.

The semiconductor body, having the polygonally shaped p-n junction, is then provided with at least four electrical conductors which will subsequently act as input and output leads. Each of the two input leads required is ohmically affixed to the semiconductor body, as by soldering for example, in such a manner that each lead contacts simultaneously the p layer and n layer of the junction, thereby short-circuiting that junction. Each of the two output leads is ohmically affixed to the semiconductor body such that one lead contacts the p layer, and the other contacts the n layers. All the leads should be spaced at convenient distances from each other so as to allow for the placing of various notches in the respective layers, to provide discontinuities therein. The only criterion with respect to the location of the leads on the device is that they be arranged in alternating fashion, such that an input lead is always intermediate two output leads, and an output lead is always intermediate two input leads.

Having thus provided the semiconductor body with electrical leads, it is then necessary to incorporate discontinuities into the layers comprising the junction for the purpose of isolating various portions of the device from one another and thereby provide a predetermined path for the flow of current therethrough. This may be achieved by mechanically cutting or etching notches into the layers at predetermined positions in such a manner that the notch extends completely through the layer into which it is cut, and preferably extends slightly into the next layer of opposite conductivity type. In general, a given output lead is separated from the next two input leads by two discontinuities, one on each side of the output lead, and provided in the layer to which that output lead is affixed. In addition, these discontinuities must be located intermediately of the two input leads. To complete the device, two additional discontinuities, one for each output lead are required. Each of these discontinuities is placed in the layer opposite in conductivity type to the layer to which each output is affixed and must be placed intermediately of the two notches cut into the layer to which that output is affixed. The device so adapted is now in proper configuration to perform full wave rectification when an A.C. signal is applied to the two input leads.

The foregoing discussion, although given with particularity as to separate steps, is illustrative of a general method for adapting a semiconductor body containing a polygonal p-n junction to perform full wave rectification. It will be appreciated by those skilled in the art that these steps may be varied according to individual preferences. This may be done without departing from the general method taught herein of providing discontinuities in the layers comprising a polygonal p-n junction in such locations as to cause certain junctions to be reverse biased with respect to a given input signal and thereby provide a predetermined path of current flow from properly positioned input leads to properly positioned output leads.

Referring now to FIGURE 1, there is shown therein a full wave rectifier of the present invention. The device as therein depicted is shown as being essentially hexagonally shaped in consequence of one method by which the original body from which the device is fashioned may be prepared, which method will be more fully described hereinafter. Generally designated at 1 is an outer silicon layer of n-type conductivity which is crystallographically affixed to and contiguous with an interiorly disposed p-type silicon layer generally designated at 2. The layers are shown so disposed for purposes of clarity of discussion only. It will be appreciated that if the layers were reversed, the respective output leads would have to be affixed to the layers opposite in conductivity to that shown. Individual junctions which are formed by the p-type and n-type layers are represented at 3, 4, 5, 6, 7 and 8. Notches designated at 9, 10, 11, 12, 13 and 14 are cut into the device, as for example with a diamond saw or drill, to allow for electrical isolation between the various junctions and provide thereby the desired path for input signals to result in rectified output signals. Inputs 15 and 16 from A.C. source are provided to contact simultaneously both the p layer and the n layer, and are affixed thereto by soldering for example, or by a convenient means known in the art. Outputs 17 and 18 are ohmically connected to the p-type layer 21 and the n-type layer 22 respectively, also by soldering or by any other convenient means known in the art. The relationship between the input and output signal leads, and the notches provided in the device is such that certain junctions are reverse biased with respect to input signals such that current may flow only through an established path through the device. This path allows an output signal of unchanging polarity to be obtained irrespective of cyclical changes in the input. Thus, any combination of notches and lead locations which provides the proper current path may be used.

Accordingly, if a negative pulse were applied at input 15 it can be seen that junction 8 will be reverse biased with respect to this signal and will not pass any current therethrough. Notches 14 and 10 isolate the pulse from the rest of the device such that the direction of flow of current must necessarily be from n-type layer 19 through junction 4 which is forward biased with respect to this input. The signal will therefore be obtained at output 17 as a negative pulse. Junction 8, which is reversed biased with respect to the negative input, therefore serves to act as a stop gate to the flow of current therethrough. Notch 9 serves to isolate the current flow through n-type layer 19 from the rest of the device and permits only current flow into the n-type layer 19 of junction 4. Notch 11 prevents the negative pulse from flowing any further than the diode represented by junction 4. Notch 12 serves to isolate output 17 from input 16 on this phase of the cycle.

When the A.C. input cycle inverts such that the negative pulse is now at input 16, it can be seen that current flow will be in the path provided by n-type layer 20 which then allows junction 5 to be forward biased with respect to this input. Current flow will continue across junction 5 through p-type layer 21 and appear at output 17 as the negative signal. Notch 11 isolates layer 20 from the n-type layer comprising the diode represented by junction 4. Junction 7 acts as a stop gate to the negative pulse at 16 by virtue of its being reverse biased with respect to that impulse. Notch 13 prevents current flow from layer 20 and isolates output 18 therefrom. Notch 14 serves to isolate inputs 15 and 16 from each other. It is seen therefore, that irrespective of the input signal polarity at inputs 15 or 16, the output polarity is always negative at output 17. Conversely, output 18 is always positive with respect to output 17 irrespective of cyclical changes at inputs 15 and 16.

Figure 2:
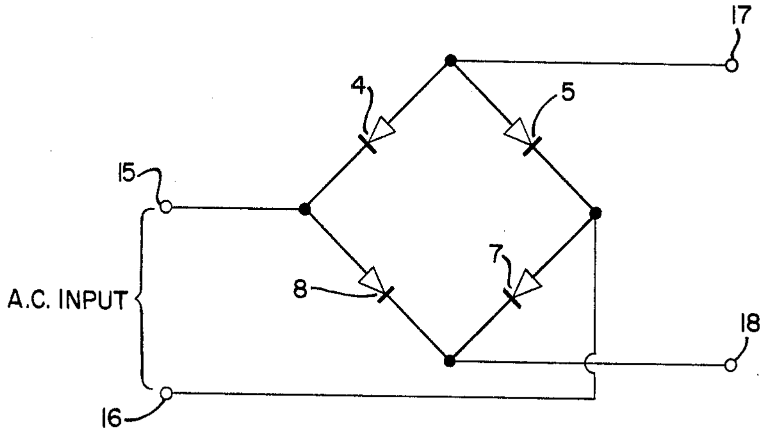
FIGURE 2 represents the electrical circuit analog for the device shown in FIGURE 1.

Referring now to FIGURE 2 there is designated an electrical circuit analog of the device shown in FIGURE 1. The various diodes have been separated and are shown as discrete operating components, but the numbering scheme designated in FIGURE 1 is maintained. Current flow from an input source such as from a transformer or any other A.C. source may be traced similarly as was done for the device in FIGURE 1. It will be seen therefore, that when the negative pulse of an A.C. cycle is at input 15, junction 4, being forward biased, allows the passage of current to the output 17 while reversed biased junction 8 acts as the stop gate to the flow of current to output 18. Junction 5, reverse biased with respect to this input, serves to isolate the positive input lead 16 from the negative input lead 15. Similarly, when the cycle is reversed and the negative input appears at 16, junction 5 now forward biased, allows current to flow therethrough such that the negative input signal appears at output 17. Junctions 4 and 7, which are reverse biased with respect to this input, serve to isolate the rest of the circuit so that the flow of current passes in the desired path.

Various methods known in the art may be employed to produce the semiconductor body from which the device of the present invention may be prepared. Illustrative of these are vapor deposition processes in which a p-n junctions is produced, and diffusion processes whereby impurities of one conductivity type are diffused into a zone refined or Czochralski pulled semiconductor crystal of opposite conductivity type. Irrespective of what method is used however, consideration must be given to the operating characteristics of the junction produced by a given process. Particularly significant in this regard is the peak inverse voltage value wihch characterizes the junction. Since the successful operation of the device of the present invention is to a large degree dependent upon the use of reverse biased junctions to isolate various portions of the device from each other, it will be apparent to those skilled in the art that the peak inverse voltage characteristic of the diodes must exceed the voltage to be rectified. Hence a process should be selected which is flexible in producing p-n junctions of various PIV's in consideration of the ultimate requirements of the final device. Various techniques may be employed for this purpose, and one such will now be described.

There is first provided a single crystal core of silicon within a suitable reaction chamber equipped with inlet and outlet nozzles for reaction gases. In the description given herein, the silicon core is oriented in the {111} fashion, although the core may have any crystal orientation and may even be polycrystalline. However, since the operating characteristics of semiconductor devices are enhanced when the material is single crystalline, the industry prefers devices fabricated therefrom and accordingly, the description following is given in terms thereof.

An electrical energy source is connected to the silicon core to allow the passage of current therethrough, thereby to heat the core by resistance heating. The core is first heated to a temperature of about 1250° C. and a stream of hydrogen passed thereover for a period of about 30 minutes.

Therefore, a quantity of decomposable vapor source of silicon atoms such as, for example silicochloroform, is introduced into the reaction chamber along with a quantity of hydrogen as a carrier gas. The gaseous mixture containing about 240 grams per hour of silicochloroform in about 330 liters per hour of hydrogen, which is a preferred composition for single crystal growth, is made to impinge upon the single crystal core which is maintained at about 1150 to 1250° C. This is continued for a period of time sufficient to deposit on the core a polygonally shaped deposit of silicon. This occurs as the liberated silicon from the thermally decomposed compound deposits onto the single crystal core in the configuration of the crystal lattice structure thereof. By virtue of the very nature of single crystalline silicon, a vapor grown body thereof, as described herein, displays a hexagonal cross section when the underlying single crystal core is oriented in the {111} fashion. When the starting core is oriented in some other configuration, a single crystal vapor deposited layer thereon will assume a different polygonal shape depending on the nature of the crystal orientation.

After the desired configuration is obtained, the gaseous stream is adjusted to include an impurity predetermined in amount and kind such that a subsequently deposited silicon layer from such source contains a desired amount of impurity atoms. It will be appreciated that both the amount and kind of impurity atoms supplied to the gaseous stream will determine the resistivity and conductivity-type of the resulting silicon deposit. Hence, it is at this point that consideration must be made of the operating characteristics and the ultimate use to which the full wave rectifier to be produced will be put. In the presently described procedure, sufficient boron trichloride is supplied to the gaseous stream to provide about $3\times10^{14}$ carriers per cc. of silicon. This will result in a subsequently deposited silicon layer having p-type conducitvity and a resistivity of about 45 ohm-cm. The impurity-laden decomposable gas stream is allowed to contact the single crystal silicon core as hereinbefore described for a period of about 15 minutes. There thus results a p-type silicon layer having a thickness of about 3 mils and conforming to the single crystal structure of the underlying previously deposited hexagonally shaped layer.

Having deposited the p-type layer, introduction of the boron trichloride into the gaseous stream is discontinued and the composition of the stream next adjusted to contain a predetermined amount of n-type conductivity impurity atoms. A convenient source for such an impurity is provided by phosphorous trichloride. Sufficient $PCl_3$ is introduced into the previously described gaseous stream to provide about $9\times10^{13}$ carriers per cc. of silicon in the subsequently deposited silicon layer. The thermal decomposition of this gaseous stream is allowed to continue for a period of about 30 minutes and resulting therefrom is a single crystal deposit of n-type silicon about 6 mils thick and having a resistivity of about 38 ohm-cm. and conforming in structure to the underlying previously deposited p-type silicon layer.

As a result of carrying out the above detailed procedure there results a hexagonally shaped single crystal, vapor deposited body of silicon containing a silicon crystal starting core, a quantity of single crystal silicon deposited thereon, and extending radially therefrom, terminating in essentially hexagonally disposed regions. The outermost portions of said regions are comprised of a p-type layer and an n-type layer, the characteristics of which are determined by the amount of impurities present in the decomposable gas source used in the vapor deposition process. When the p-layer and n-layer have the characteristics hereinabove indicated, a junction formed by these layers will exhibit a PIV of about 1000 volts.

The hexagonally shaped silicon rod formed in accordance with the above procedure may then be adapted for use as the full wave rectifier of the present invention by cutting therefrom a wafer of desired thickness. A convenient thickness therefor is of the order of one millimeter. The cutting may be performed by any conventional means known in the art, such as by diamond saw, and is taken in a direction lateral to the longitudinal axis of the rod.

The inner portion of the wafer, that is the core and the first deposited quantity of silicon, is then preferably removed from the wafer as by cutting, for example, so as to retain only the last two layers deposited and the junction formed thereby. This step is not critical when the inner portion is of a resistivity high enough to prevent undesirable electrical continuity between various portions of the external layers. However, removal of the inner portion is advantageous in that its absence allows better heat dissipation during the operation of the rectifier. Notches are then cut or etched into the prepared wafer and input and output leads are then affixed to the wafer in such a manner as to isolate various portions of the final device from each other as hereinbefore described. There is thus obtained a full wave rectifier which contains a p-n junction having a PIV of about 1000 volts.

There has thus been described a novel structure for use as a full wave rectifier device which may be utilized in various electrical applications. Although the foregoing description has been given with reference to a hexagonally shaped silicon wafer as the starting body from which the device of the present invention is prepared, it will be appreciated that a semiconductor body of any shape, having a closed, continuous p-n junction therein, may be subjected to the treatment as hereinabove described. In addition, the operative part of the device of the present invention may also contain low resistivity regions contiguous with each layer to expedite the soldering of input and output leads. Thus, each layer may have an adjoining layer of like conductivity but of resistivity in the so-called "plus" range without impairing the operation of the device, provided that the general principles of the present invention are adhered to.

Any such changes and modifications as come within the scope of the present invention are intended to be encompassed within the appended claims.

What is claimed is:

1. A unitary solid state semiconductor structure useful in obtaining full wave rectification which comprises a unitary semiconductor body containing a series of polygonally disposed rectifying diodes crystallographically affixed to each other, said diodes having a p-n junction therein; first and second input leads ohmically affixed to and conveniently spaced around said semiconductor body in such a manner as to contact simultaneously the p layer and the n layer of the diodes to which they are affixed; a first output lead ohmically affixed to one layer of said p-n junction at a point intermediate said first and second input leads and separated therefrom by a first discontinuity in the layer to which said first output is affixed and at a point located intermediately of said first input and said first output, and a second discontinuity in said layer to which said first output is affixed and located intermediately of said second input and said first output lead, and a first discontinuity in the layer opposite in conductivity type to which said first output lead is affixed and located intermediately of said first and second discontinuities and in proximity with said first output; a second output lead ohmically affixed to the layer opposite in conductivity type to the layer to which said first output lead is affixed and at a point intermediate said first and second input leads such that all of said input and output leads are located alternately around said semiconductor body, said second output being separated from said first and second inputs by two discontinuities in the layer to which said second output is affixed, the first of such discontinuities being located intermediately of said second output and said first input, and the second of such discontinuities being located intermediately of said second output and said second input, and an additional discontinuity in the layer opposite in conductivity type to the layer to which said second output is affixed, said discontinuity being located intermediately of said two discontinuities and in proximity with said second output.

2. The full wave rectifier of claim 1 wherein the semiconductor body is essentially single crystalline silicon.

3. The full wave rectifier of claim 1 wherein the semiconductor body is silicon oriented in the {111} fashion.

References Cited by the Examiner

UNITED STATES PATENTS

| | | | |
|---|---|---|---|
| 2,459,787 | 1/1949 | Bloom | 317—234 |
| 2,655,625 | 10/1953 | Burton | 317—234 |
| 2,875,505 | 3/1959 | Pfann | 317—235 |
| 3,159,780 | 12/1964 | Parks | 317—235 |

JOHN W. HUCKERT, *Primary Examiner.*

JAMES D. KALLAM, DAVID J. GALVIN, *Examiners.*